(12) United States Patent
Ha et al.

(10) Patent No.: US 7,002,651 B2
(45) Date of Patent: Feb. 21, 2006

(54) TRANSFLECTIVE TYPE LIQUID CRYSTAL DISPLAY DEVICE AND METHOD FOR MANUFACTURING THE SAME

(75) Inventors: Yong Min Ha, Gumsi-shi (KR); Han Wook Hwang, Seoul (KR)

(73) Assignee: LG. Philips LCD Co., Ltd., Seoul (KR)

( * ) Notice: Subject to any disclaimer, the term of this patent is extended or adjusted under 35 U.S.C. 154(b) by 51 days.

(21) Appl. No.: 10/849,149

(22) Filed: May 20, 2004

(65) Prior Publication Data

US 2004/0233361 A1 Nov. 25, 2004

(30) Foreign Application Priority Data

May 23, 2003 (KR) ...................... 10-2003-0032957

(51) Int. Cl.
*G02F 1/1335* (2006.01)
(52) U.S. Cl. .................. 349/114; 349/113; 349/38; 349/43
(58) Field of Classification Search ................. 349/114
See application file for complete search history.

(56) References Cited

FOREIGN PATENT DOCUMENTS

| JP | 2000-267596 | 9/2000 |
|---|---|---|
| JP | 2001-343670 | 12/2001 |

*Primary Examiner*—Robert Kim
*Assistant Examiner*—Lucy Chien
(74) *Attorney, Agent, or Firm*—Birch, Stewart, Kolasch & Birch, LLP (57) ABSTRACT

A transflective type liquid crystal display (LCD) device and method for manufacturing the same is disclosed, in which it is possible to decrease manufacturing cost and improve yield by decreasing the number of masks. The transflective type LCD device includes a substrate having reflection and transmission regions, a first insulating layer on an entire surface of the substrate whereon gate and storage electrodes are formed at predetermined portions, a transparent electrode overlapped with the storage electrode and formed over the transmission region of the first insulating layer, and a second insulating layer formed over the reflection region of the substrate and having a contact hole for exposing a predetermined portion of the transparent electrode.

20 Claims, 13 Drawing Sheets

TRANSFLECTIVE TYPE LIQUID CRYSTAL DISPLAY DEVICE AND METHOD FOR MANUFACTURING THE SAME

This application claims the benefit of the Korean Application No. P2003-32957 filed on May 23, 2003, which is hereby incorporated by reference.

BACKGROUND OF THE INVENTION

1. Field of the Invention

The present invention relates to a method for manufacturing a liquid crystal display (LCD) device, and more particularly, to a transflective (reflective-transmission) type liquid crystal display (LCD) device and method for manufacturing the same to improve yield by decreasing the number of masks.

2. Discussion of the Related Art

With development of information in society, demands for various display devices have increased. Accordingly, many efforts have been made to research and develop various flat display devices such as liquid crystal displays (LCDs), plasma display panels (PDP), electroluminescent displays (ELD), and vacuum fluorescent displays (VFD). Moreover, some species of the flat display devices have already been applied to displays of various equipment.

Among the various flat display devices, the LCD device has been most widely used due to advantageous characteristics of thinness, lightness in weight, and low power consumption. Thus, LCD devices are used as substitute for Cathode Ray Tubes (CRT). In addition to mobile type LCD devices, such as displays for notebook computers, LCD devices have been developed for computer monitors and televisions to receive and display broadcasting signals.

Despite various technical developments in LCD technology with applications in different fields, research for enhancing the picture quality of LCD devices has been, in some respects, lacking as compared to other features and advantages of LCD devices. To use LCD devices in various fields as general displays, a key to developing LCD devices depends on whether an LCD devices can achieve a high quality picture, including high resolution and high luminance with a large-sized screen while still maintaining lightness of weight, thinness, and low power consumption.

LCD devices display images or pictures by controlling light transmittance with an electric field applied to liquid crystals having a dielectric anisotropy.

A LCD device is different from display devices such as an electroluminescence (EL) device, a cathode ray tube (CRT) and a light emitting diode (LED) device that emits light itself in that the LCD device makes use of ambient light as a light source.

LCD devices are classified into two different types: a transmission type LCD device and a reflection type LCD device, according to the light source employed. A transmission type LCD device has a backlight as a light source at the rear of an LCD panel, so that a transmission type LCD device can display a picture image in low light surroundings by controlling light transmittance according to the alignment of liquid crystals. However, the transmission type LCD device has problems in that it requires relatively high power consumption. Meanwhile, a reflection type LCD device makes use of ambient light as a light source, thereby having a relatively small amount of power consumption. However, a reflection type LCD device has problems in that it cannot display a picture image in low light surroundings such as found in cloudy or unclear weather.

In order to solve the problems of both the transmission and reflection types of LCD device, a transflective (reflective-transmission) type LCD device has been proposed. The transflective type LCD device can be formed as a reflection type or a transmission type of LCD device, as needed.

Hereinafter, a related art transflective type LCD device and method for manufacturing the same will be described with reference to the accompanying drawings.

Figure 1:
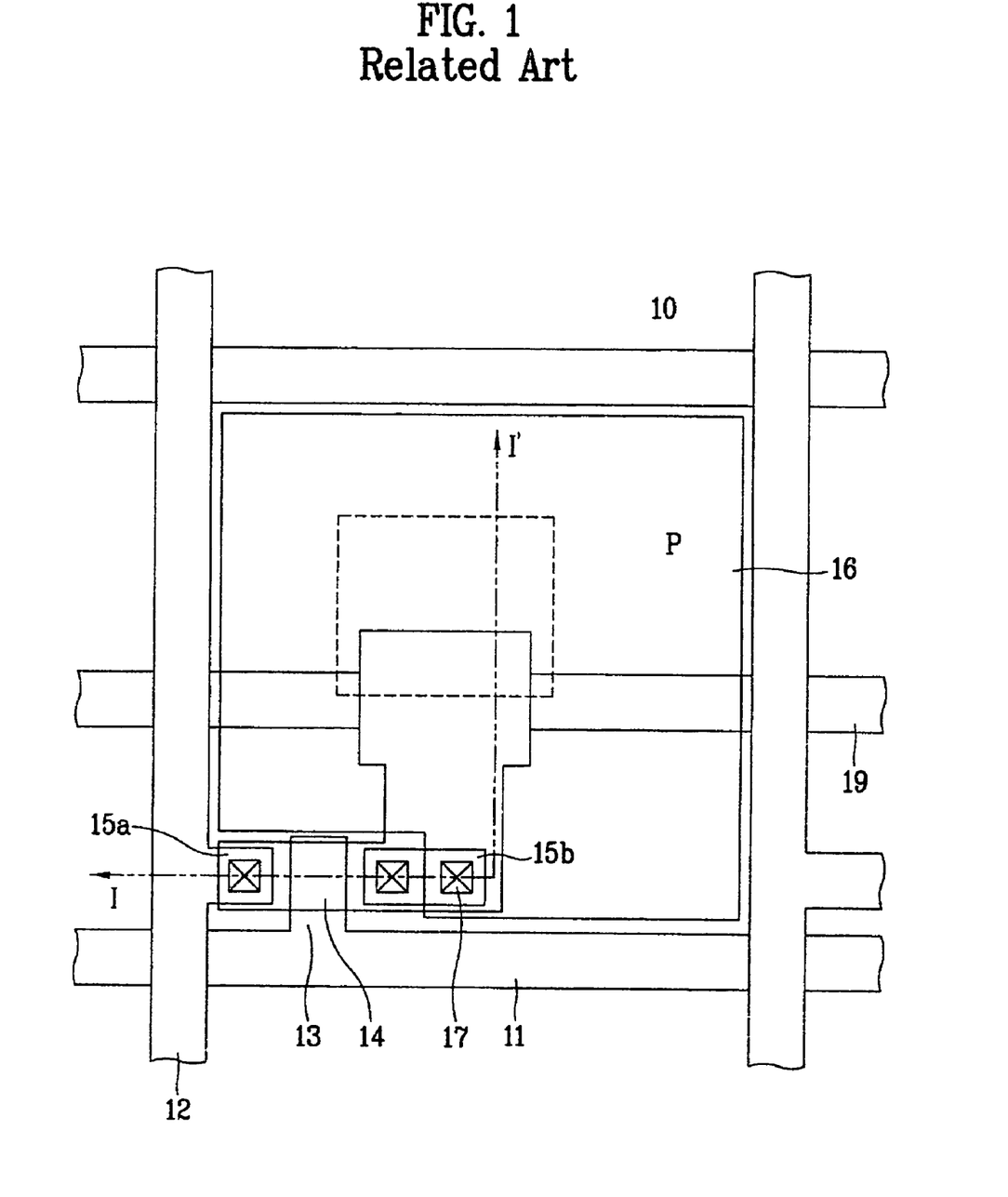
FIG. 1 is a plan view illustrating a related art transflective type LCD device.

FIG. 1 is a plan view illustrating the related art transflective type LCD device.

As shown in FIG. 1, a plurality of gate lines 11 are formed on a lower substrate 10 at fixed intervals, and a plurality of data lines 12 are formed for being in perpendicular to the gate lines 11 at fixed intervals, thereby defining a plurality of pixel regions. Meanwhile, a storage line 19 is formed parallel to the gate line 11 at a predetermined interval from the gate line 11, thereby crossing the pixel region P and an active layer 14.

In the pixel region P, defined by crossing the gate and data lines 11 and 12 to each other, a transparent electrode 16 is formed in a matrix type. Also, a thin film transistor is formed to transmit a signal of the data line 12, being switched by a signal of the gate line 11, to the transparent electrode 16.

The thin film transistor includes a gate electrode 13, a gate insulating layer (not shown), the active layer 14, a source electrode 15a and a drain electrode 15b. The gate electrode 13 extends from the gate line 11. The gate insulating layer is formed on an entire surface of the lower substrate 10. Also, the active layer 14 is formed on the gate insulating layer above the gate electrode 13. The source electrode 15a extends from the data line 12, and the drain electrode 15b is opposite to the source electrode 15a. In this state, the drain electrode 15b is electrically connected with the transparent electrode 16 through a contact hole 17.

Also, a reflective electrode 18 is formed at a predetermined portion of the pixel region to be overlapped with the transparent electrode 16.

Meanwhile, the lower substrate 10 having the aforementioned structure is attached to an upper substrate (not shown) with a gap therebetween.

At this time, the upper substrate includes a black matrix layer, a color filter layer of R/G/B, and a common electrode (not shown). The black matrix layer has openings corresponding to the pixel regions formed on the lower substrate 10, and prevents light. Also, the color filter layer of R/G/B is formed to obtain various colors. The common electrode drives liquid crystal with the transparent electrode 16 (reflective electrode).

The lower substrate 10 is attached to the upper substrate with a gap therebetween by spacers. After that, the lower and upper substrates are bonded to each other by a sealant, and then liquid crystal is injected between the lower and upper substrates.

Figure 2:
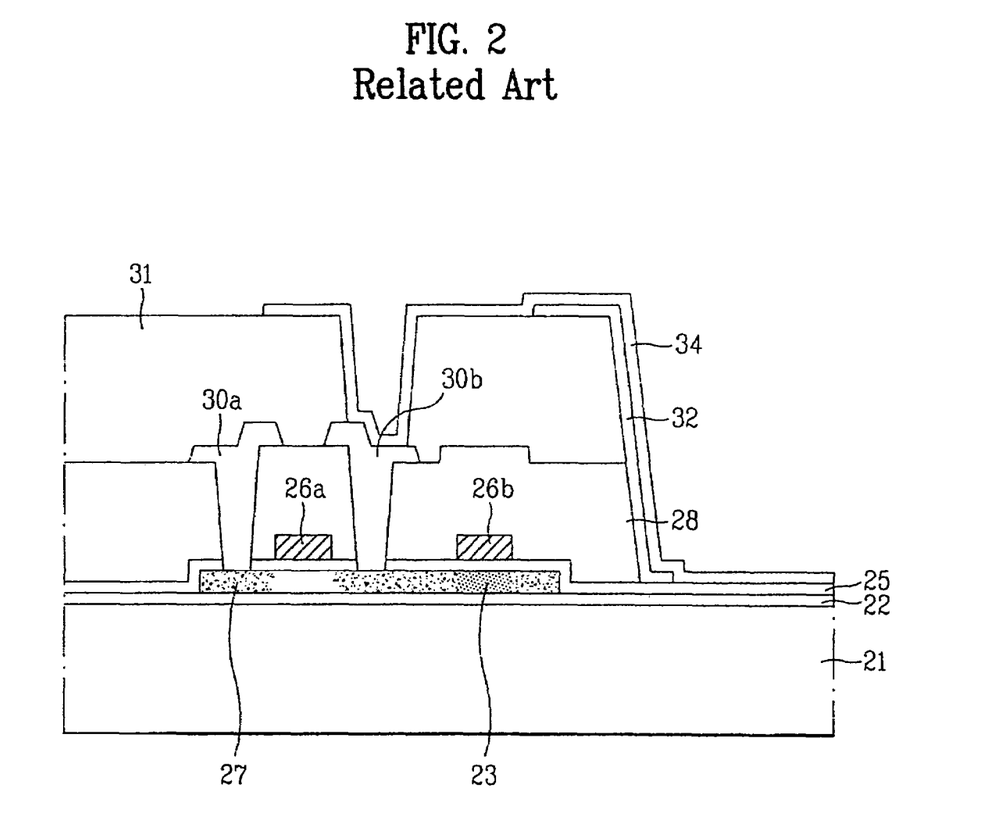
FIG. 2 is a cross-sectional view illustrating a related art transflective type LCD device taken along line I–I' of FIG. 1.

FIG. 2 is a cross-sectional view illustrating the related art transflective type LCD device taken along line I–I' of FIG. 1.

As shown in FIG. 2, the related art transflective type LCD device includes an insulating substrate 21, a buffer layer 22, an active layer 23, a gate insulating layer 25, gate and storage electrodes 26a and 26b, source/drain impurity regions 27, an insulating interlayer 28, source and drain electrodes 30a and 30b, a passivation layer 31, a reflective electrode 32, and a transparent electrode 34.

The insulating substrate 21 is formed of a reflection region and a transmission region. The buffer layer 22 is formed on the insulating substrate 21, and the active layer 23 is formed on a predetermined portion of the buffer layer 22.

Then, the gate insulating layer 25 is formed on an entire surface of the insulating layer 21 including the active layer 23. The gate and storage electrodes 26a and 26b are formed on the gate insulating layer 25 corresponding to the active layer 23. The source/drain impurity regions 27 are formed on the active layer 23 at both sides of the gate electrode 26a. Also, the insulating interlayer 28 is formed on the reflection region of the insulating substrate 21, and has a first contact hole for exposing predetermined portions of the source/drain impurity regions 27. The source and drain electrodes 30a and 30b are connected with the source/drain impurity regions 27 through the first contact hole. The passivation layer 31 is formed over the reflection region of the insulating substrate 21, and has a second contact hole for exposing a predetermined portion of the drain electrode 30b. After that, the reflective electrode 32 is formed over a predetermined portion of the passivation layer 31. The transparent electrode 34 is overlapped with the reflective electrode 32, and connected with the drain electrode 30b through the second contact hole so that the transparent electrode 34 is formed over the transmission region of the insulating substrate 21.

At this time, the transparent electrode 34 is overlapped with the reflective electrode 32, and is formed in the pixel region for crossing the gate line (11 of FIG. 1) to the data line (12 of FIG. 1).

FIGS. 3A to 3H are cross-sectional views illustrating the related art transflective type LCD device taken along line I–I' of FIG. 1.

Figure 3A:
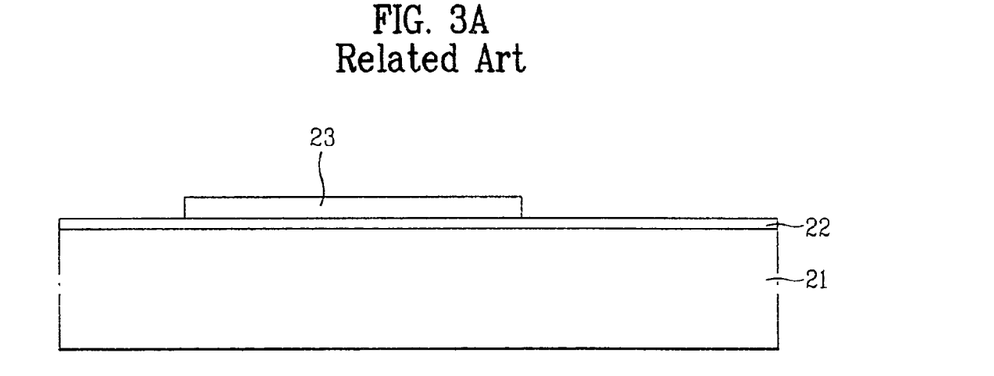
FIG. 3A to FIG. 3H are cross-sectional views illustrating manufacturing process steps of a related art transflective type LCD device taken along line I–I' of FIG. 1.

As shown in FIG. 3A, the buffer layer 22 is formed over the insulating substrate 21, and an amorphous silicon layer is formed on the buffer layer 22. Subsequently, laser or heat is applied to the amorphous silicon layer so that a polycrystalline silicon layer is formed. Then, the polycrystalline silicon layer is selectively removed by photolithography, whereby the active layer 23 is formed.

Figure 3B:
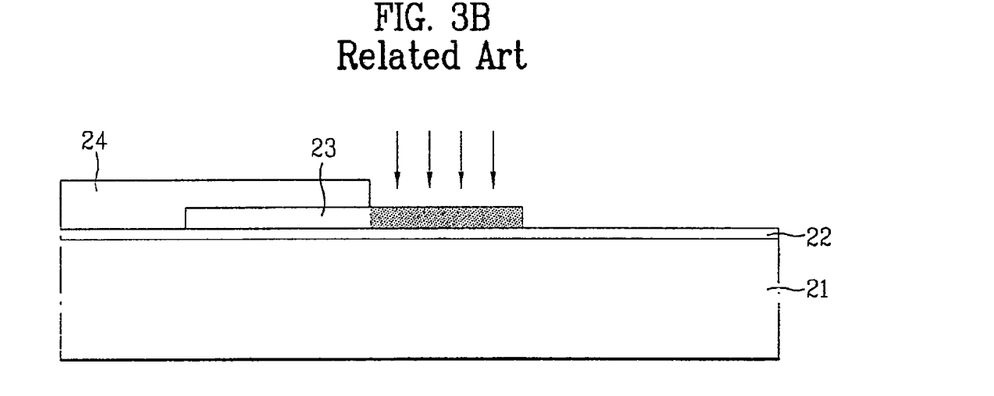

As shown in FIG. 3B, a photoresist 24 is deposited on the entire surface of the insulating substrate 21 including the active layer 23. After that, the photoresist 24 is patterned by exposure and developing process, thereby defining a capacitor region. Then, conductive impurity ions are injected into the exposed active layer 23 by using the patterned photoresist 24 as a mask. The conductive impurity ions are injected to the active layer 23 since the active layer 23, the polycrystalline silicon layer, has no conductivity. Because of injection of the conductive impurity ions, the active layer 23 obtains conductivity so that can be used as a lower electrode of a storage capacitor.

Figure 3C:
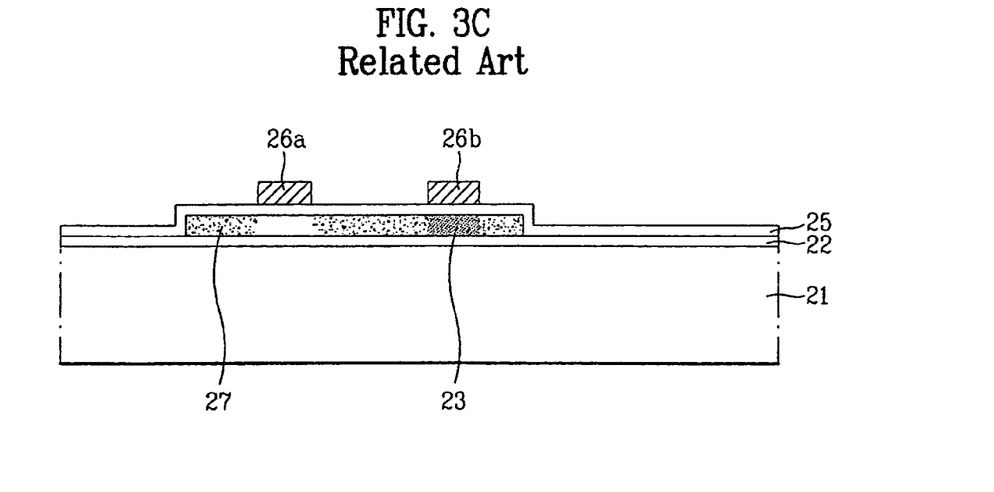

As shown in FIG. 3C, after removing the photoresist 24, the gate insulating layer 25 is formed over the entire surface of the insulating substrate 21 including the active layer 23. Then, a low-resistance metal layer is formed on the gate insulating layer 25. The metal layer is selectively removed by photolithography, thereby forming the gate electrode 26a and the storage electrode 26b at a predetermined interval from each other on the gate insulating layer 25 corresponding to the active layer 23.

The gate insulating layer 25 is formed by depositing silicon oxide or silicon nitride in a CVD (Chemical Vapor Deposition) method. The metal layer is formed in a method of depositing a conductive metal layer such as aluminum Al, aluminum alloy AlNd, chrome Cr, tungsten W or molybdenum Mo by sputtering.

Subsequently, n-type or p-type impurity ions are selectively doped on the entire surface of the insulating substrate 21 by using the gate electrode 26a as a mask. Thus, the source/drain impurity regions 27 are formed on the active layer 23 at both sides of the gate electrode 26a.

Figure 3D:
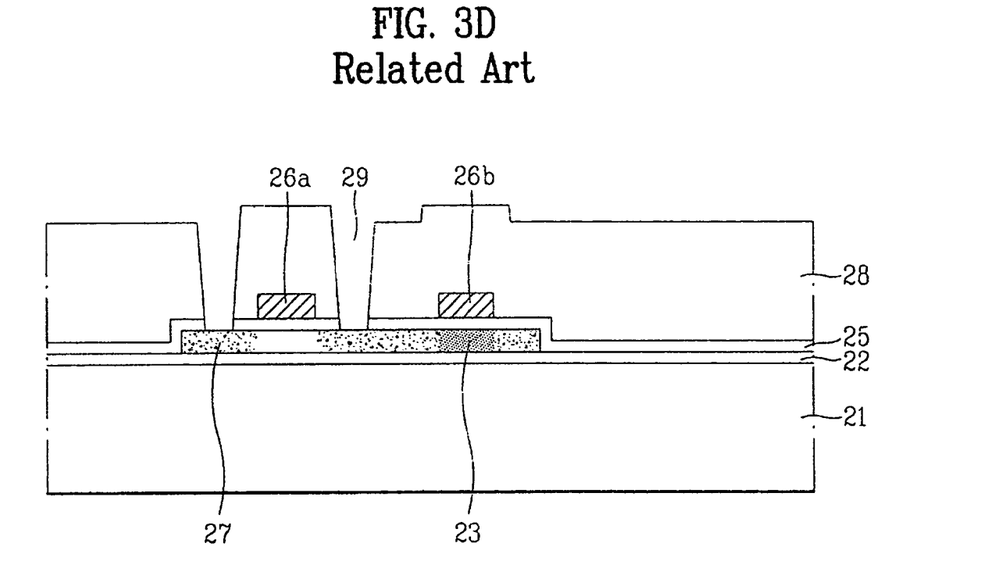

As shown in FIG. 3D, the insulating interlayer 28 is formed over the entire surface of the insulating substrate 21 including the gate electrode 26a. Then, the insulating interlayer 28 is selectively removed to expose the predetermined portions of the source/drain impurity regions 27 by photolithography, thereby forming the first contact hole 29. The insulating interlayer 28 is formed of inorganic insulating material such as silicon nitride or silicon oxide, or organic insulating material having low dielectric constant such as acrylic organic compound, Teflon, BCB, cytop or PFCB.

Figure 3E:
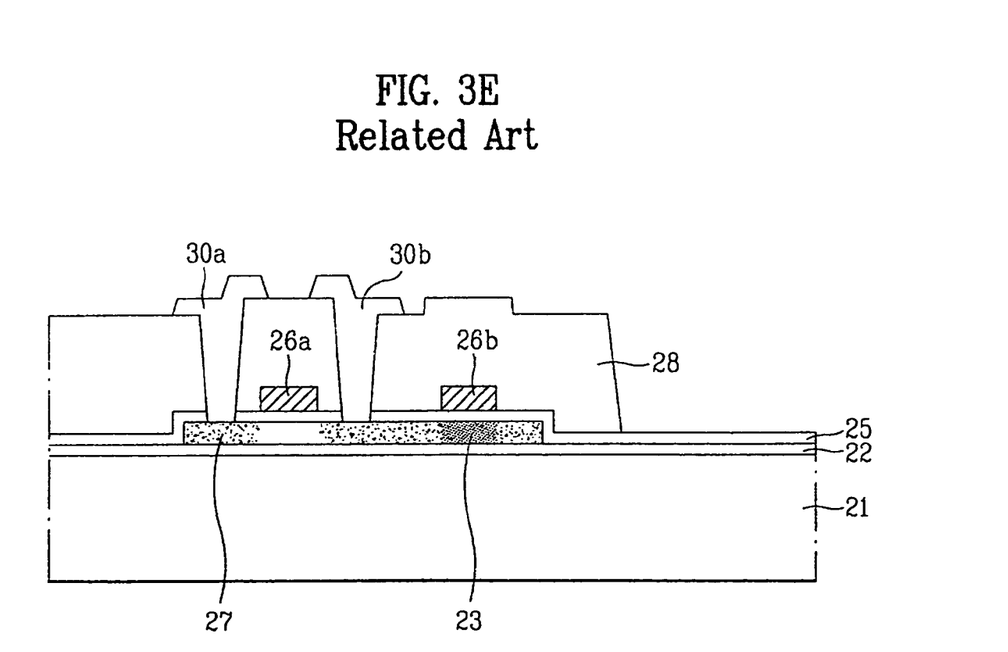

As shown in FIG. 3E, the metal layer is deposited on the entire surface of the insulating substrate 21 including the first contact hole 29. Then, the metal layer is selectively removed by photolithography. Thus, the source and drain electrodes 30a and 30b are electrically connected with the source/drain impurity regions 27 through the first contact hole 29. The metal layer is formed of metal such as aluminum Al, copper Cu, tungsten W, chrome Cr, molybdenum Mo, titanium Ti or tantalum Ta, or molybdenum alloy such as MoW, MoTa or MoNb. After that, the insulating interlayer 28 corresponding to the transmission region is selectively removed by photolithography.

Figure 3F:
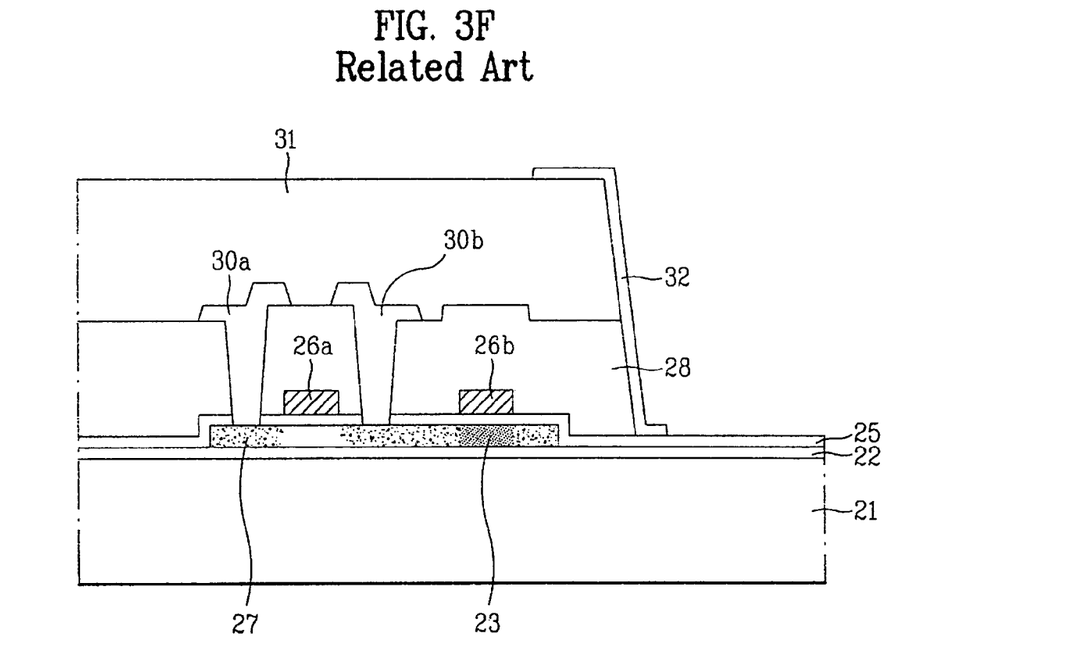

As shown in FIG. 3F, the passivation layer 31 of organic insulating material is formed on the entire surface of the insulating substrate 21 including the source and drain electrodes 30a and 30b. Then, the passivation layer 31 corresponding to the transmission region is selectively removed by photolithography.

Meanwhile, the surface of the passivation layer 31 may be selectively removed by photolithography, so that the passivation layer 31 has an uneven surface. Next, an opaque metal layer is deposited on the entire surface of the insulating substrate 21 including the passivation layer 31. Subsequently, the opaque metal layer is selectively removed by photolithography to form the reflective electrode 32.

Figure 3G:
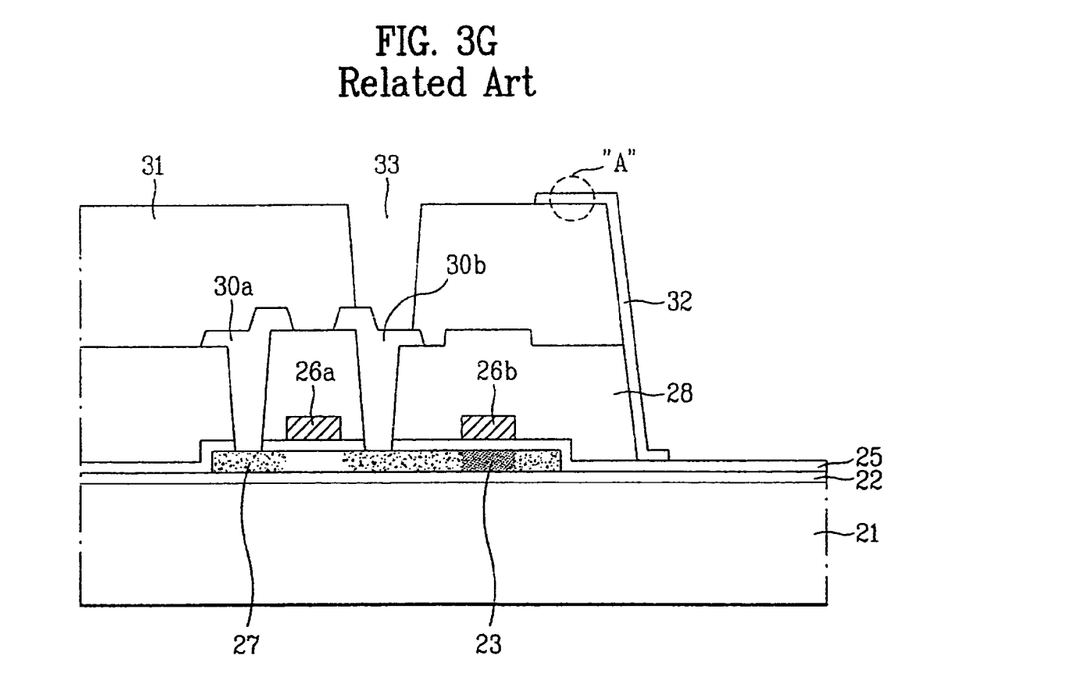

As shown in FIG. 3G, the passivation layer 31 is selectively removed to expose a predetermined portion of the drain electrode 30b, thereby forming the second contact hole 33.

Figure 3H:
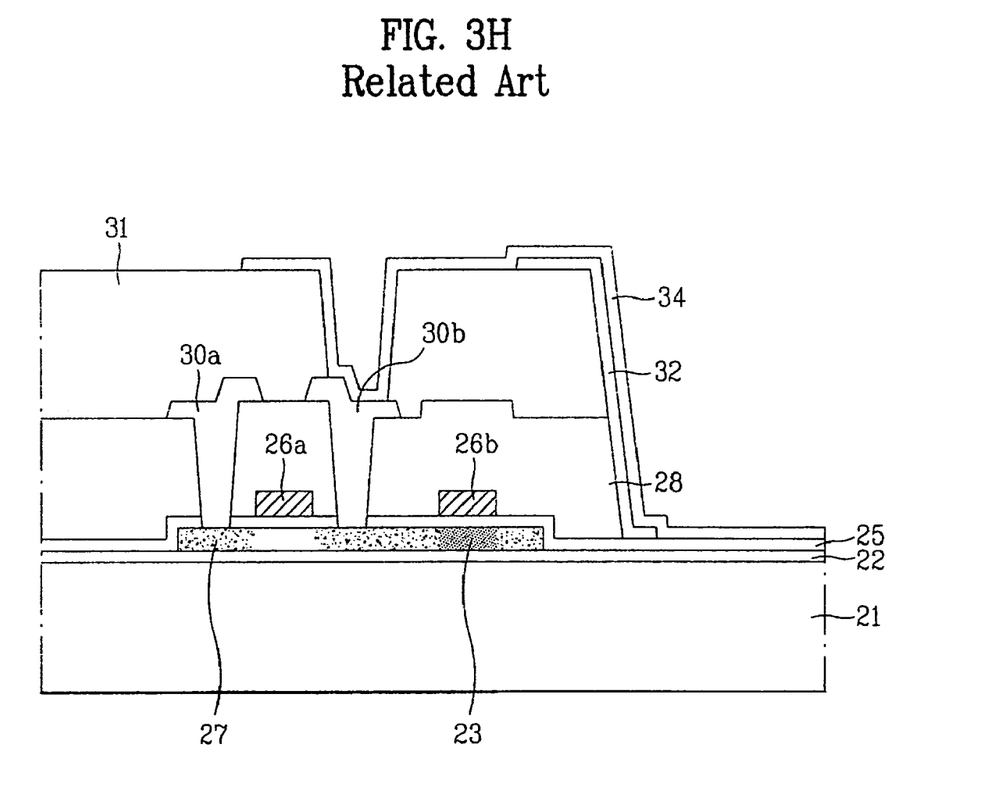

As shown in FIG. 3H, a transparent metal layer is deposited on the entire surface of the insulating substrate 21 including the second contact hole 33. Then, the transparent electrode 34 completely covering the reflective electrode 32 is electrically connected with the drain electrode 30b by photolithography.

The metal layer is formed of ITO (indium-tin-oxide), IZO (indium-zinc-oxide) or ITZO (indium-tin-zinc-oxide), Al, AlNd, Cr or Mo by the CVD method or sputtering. An insulating layer may be formed between the transparent electrode 34 and the reflective electrode 32.

Figure 4:
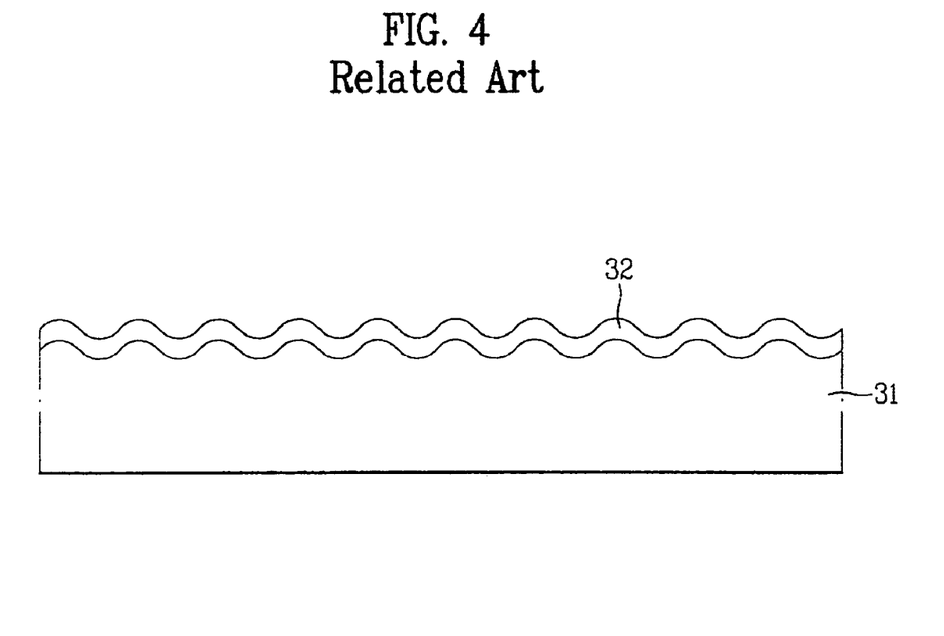
FIG. 4 is an expanded cross-sectional view illustrating 'A' portion of FIG. 3G.

FIG. 4 is an expanded cross-sectional view illustrating 'A' portion of FIG. 3G.

As shown in FIG. 4, the passivation layer 31 has an uneven surface, and the reflective electrode 32 is formed on the passivation layer 31 including its uneven surface.

The reflective electrode 32 has an uneven surface according to the uneven surface formed on the passivation layer 31. As a result, when incident light is reflected on the reflective electrode 32, and is emitted again, it is possible to concentrate the light being incident at different angles to a predetermined angle.

However, the related art transflective type LCD device and method for manufacturing the same has the following disadvantages.

First, an additional mask is used when injecting the conductive impurity ions into the active layer so as to obtain conductivity in the active layer that is used as the lower electrode of the storage capacitor, thereby increasing manufacturing cost.

Also, the related art transflective type LCD device and method for manufacturing the same require masks for selectively removing the insulating interlayer exposing the predetermined portion of the drain electrode, and defining the transmission region. Thus, the number of masks is increased in manufacturing process steps, thereby increasing manufacturing cost.

SUMMARY OF THE INVENTION

Accordingly, the present invention is directed to a transflective type liquid crystal display (LCD) device and method for manufacturing the same that substantially obviates one or more problems due to limitations and disadvantages of the related art.

An object of the present invention is to provide a transflective type liquid crystal display (LCD) device and method for manufacturing the same, to obtain a storage capacitance with a decreased number of masks.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a transflective type liquid crystal display (LCD) device includes a substrate having reflection and transmission regions; an active layer on the reflection region of the substrate; a gate insulating layer on an entire surface of the substrate including the active layer; gate and storage electrodes on the gate insulating layer corresponding to the active layer at a predetermined interval therebetween; source/drain impurity regions on the active layer at both sides of the gate electrode; a first insulating layer on the entire surface of the substrate including the gate electrode; a transparent electrode on the transmission region of the first insulating layer, and overlapped with the storage electrode; a second insulating layer on the reflection region of the substrate, and having a first contact hole for exposing predetermined portions of the source/drain impurity regions and the transparent electrode; source and drain electrodes connected with the source/drain impurity regions and the transparent electrode through the first contact hole; a third insulating layer on the reflection region of the substrate, and having a second contact hole for exposing a predetermined portion of the drain electrode; and a reflective electrode connected with the drain electrode and the transparent electrode through the second contact hole, and formed on the reflection region of the substrate.

In another aspect of the invention, a method for manufacturing a transflective type liquid crystal display (LCD) device includes the steps of preparing an insulating substrate having reflection and transmission regions; forming an active layer on the reflection region of the insulating substrate; forming a gate insulating layer on an entire surface of the insulating substrate including the active layer; forming gate and storage electrodes on the gate insulating layer corresponding to the active layer at a predetermined interval therebetween; forming source/drain impurity regions on the active layer at both sides of the gate electrode; forming a first insulating layer on the entire surface of the insulating substrate including the gate electrode; forming a transparent electrode on the transmission region of the first insulating layer, and overlapped with the storage electrode; forming a second insulating layer on the reflection region of the insulating substrate, and having a first contact hole for exposing predetermined portions of the source/drain impurity regions and the transparent electrode; forming source and drain electrodes connected with the source/drain impurity regions and the transparent electrode through the first contact hole; forming a third insulating layer on the reflection region of the insulating substrate, and having a second contact hole for exposing predetermined portions of the transparent electrode and the drain electrode; and forming a reflective electrode connected with the transparent electrode and the drain electrode through the second contact hole.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, a transflective type liquid crystal display (LCD) device according to the present invention and a method for manufacturing the same will be described with reference to the accompanying drawings.

Figure 5:
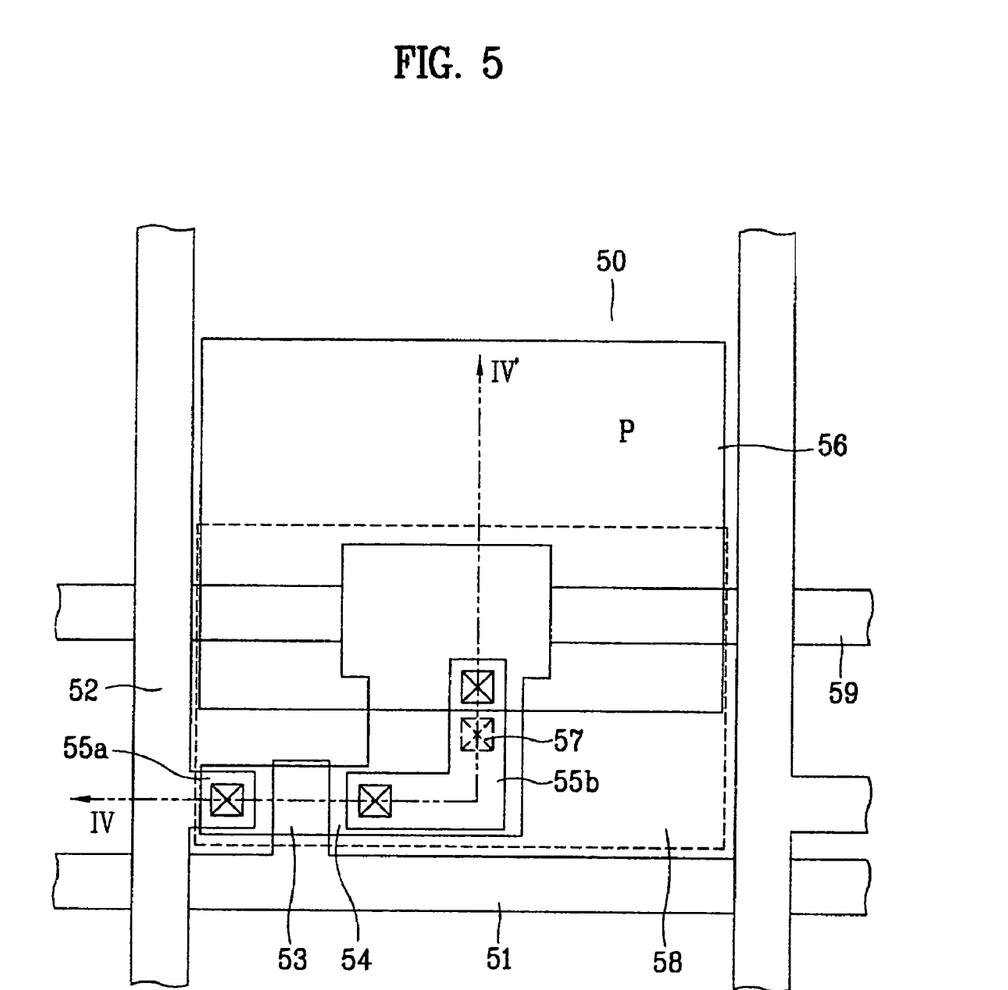
FIG. 5 is a plan view illustrating a transflective type LCD device according to the present invention.

FIG. 5 is a plan view illustrating a transflective type LCD device according to the present invention. As shown in FIG. 5, a plurality of gate lines 51 are formed on a lower substrate 50 at fixed intervals, and a plurality of data lines 52 are formed for being in perpendicular to the gate lines 51 at fixed intervals, thereby defining a plurality of pixel regions. Meanwhile, a storage line 59 is formed parallel to the gate line 51 at a predetermined interval from the gate line 51, thereby crossing the pixel region and an active layer 54.

In the pixel region P defined by crossing the gate and data lines 51 and 52 to each other, a transparent electrode 56 is formed in a matrix type. Also, a thin film transistor is formed to transmit a signal of the data line 52, being switched by a signal of the gate line 51, to the transparent electrode 56.

The thin film transistor includes a gate electrode 53, a gate insulating layer (not shown), the active layer 54, a source electrode 55a and a drain electrode 55b. The gate electrode 53 extends from the gate line 51. The gate insulating layer (not shown) is formed on an entire surface of the lower substrate 50. Also, the active layer 54 is formed on the gate insulating layer above the gate electrode 53. The source electrode 55a extends from the data line 52, and the drain electrode 55b is opposite to the source electrode 55a. In this state, the drain electrode 55b is electrically connected with the transparent electrode 56 through a contact hole 57. Also, a reflective electrode 58 is formed at a predetermined portion of the pixel region to be overlapped with the transparent electrode 56.

The lower substrate 50 having the aforementioned structure is attached to an upper substrate (not shown) with a gap therebetween.

The upper substrate includes a black matrix layer, a color filter layer of R/G/B, and a common electrode (not shown). The black matrix layer has openings corresponding to the pixel regions formed on the lower substrate 50, and prevents light. Also, the color filter layer of R/G/B is formed to obtain various colors. The common electrode drives liquid crystal with the transparent electrode (reflective electrode) 56.

The lower substrate 50 is attached to the upper substrate with a gap therebetween by spacers. After that, the lower and upper substrates are bonded to each other by a sealant, and then liquid crystal material is injected between the lower and upper substrates.

Figure 6:
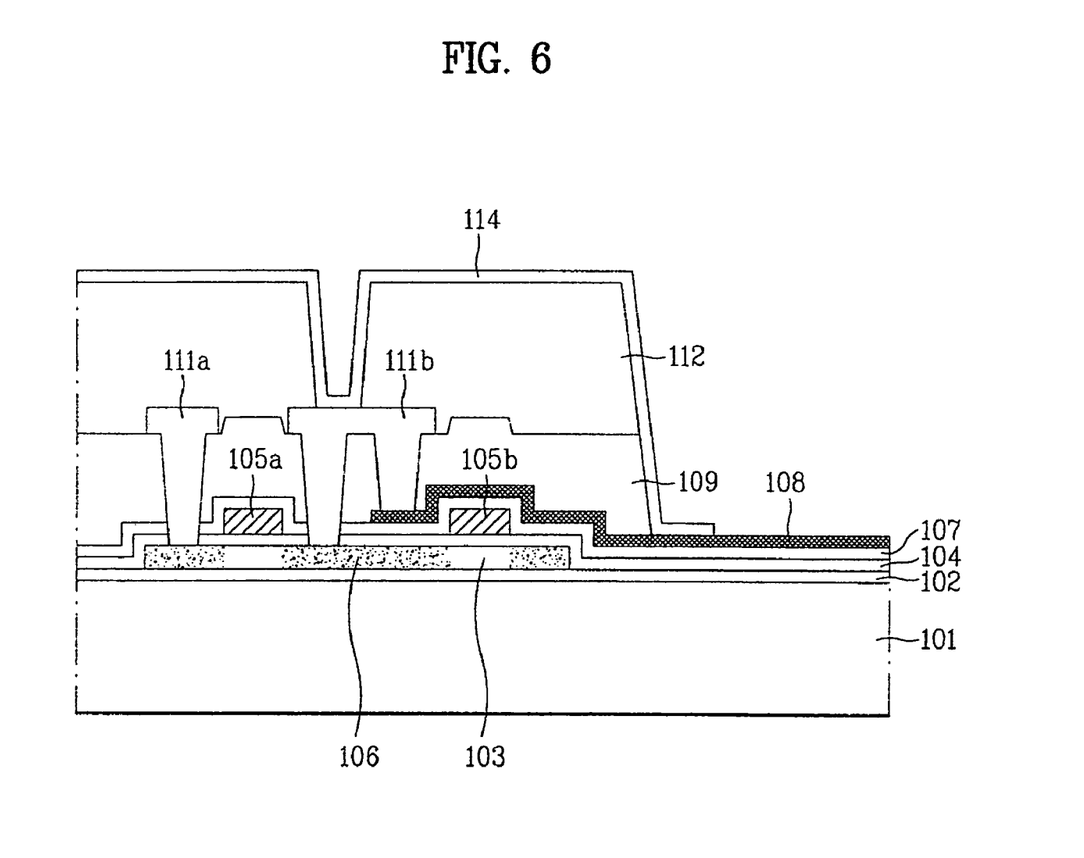
FIG. 6 is a cross-sectional view illustrating a transflective type LCD device of the present invention taken along line IV–IV' of FIG. 5.

FIG. 6 is a cross-sectional view illustrating a transflective type LCD device of the present invention taken along line IV–IV' of FIG. 5. As shown in FIG. 6, the transflective type LCD device includes an insulating substrate 101, a buffer layer 102, an active layer 103, a gate insulating layer 104, gate and storage electrodes 105a and 105b, source/drain impurity regions106, a first insulating layer 107, a transparent electrode 108, a second insulating layer 109, source and drain electrodes 111a and 111b, a third insulating layer 112, and a reflective electrode 114.

The insulating substrate 101 is formed of a reflection region and a transmission region. The buffer layer 102 is formed on an entire surface of the insulating substrate 101. Then, the active layer 103 is formed over the reflection region of the buffer layer 120. The gate insulating layer 104 is formed on the entire surface of the insulating substrate 101 including the active layer 103. The gate and storage electrodes 105a and 105b are formed at a predetermined interval on the gate insulating layer 104 corresponding to the active layer 103. The source/drain impurity regions 106 are formed on the active layer 130 at both sides of the gate electrode 105a. The first insulating layer 107 is formed over the entire surface of the insulating substrate 101 including the gate electrode 105a. Then, the transparent electrode 108 is overlapped with the storage electrode 105b, and is formed on the transmission region of the first insulating layer 107. The second insulating layer 109 is formed on the reflection region of the insulating substrate 101, and has a first contact hole for exposing predetermined portions of the source/drain impurity regions 106 and the transparent electrode 108. Also, the source electrode 111a and the drain electrode 111b are connected with the source/drain impurity regions 106 and the transparent electrode 108 by the first contact hole. The third insulating layer 112 is formed on the reflection region of the insulating substrate 101, and has a second contact hole for exposing a predetermined portion of the drain electrode 111b. The reflective electrode 114 is connected with the drain electrode 111b and the transparent electrode 108 through the second contact hole, and is formed at a portion corresponding to the reflection region of the insulating substrate 101. At this time, the third insulating layer 112 has an uneven surface.

FIG. 7A to FIG. 7G are cross-sectional views illustrating manufacturing process steps of a transflective type LCD device according to the present invention.

Figure 7A:
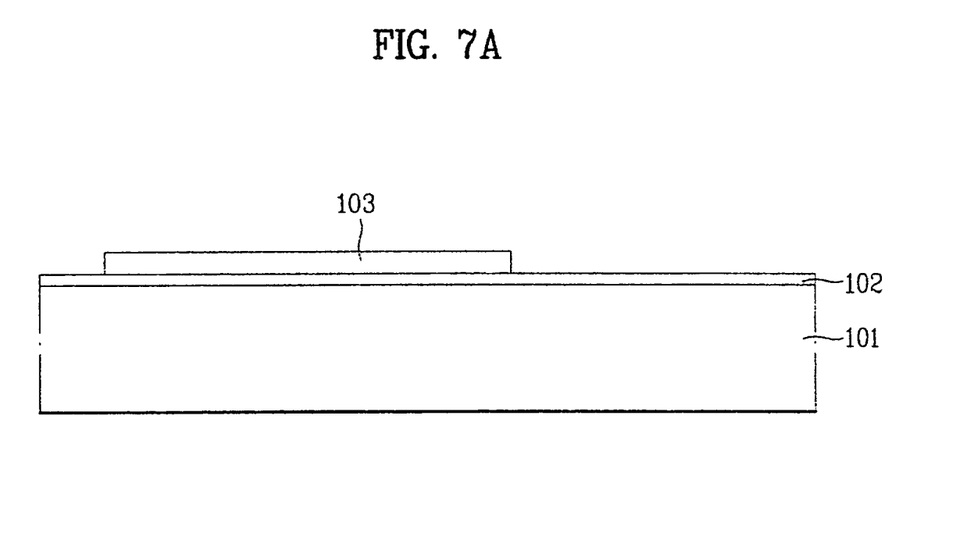
FIG. 7A to FIG. 7G are cross-sectional views illustrating manufacturing process steps of a transflective type LCD device of the present invention.

As shown in FIG. 7A, the buffer layer 102 is formed of silicon oxide or silicon nitride on the insulating substrate 101. Then, an amorphous silicon layer is formed on the buffer layer 102. At this time, the amorphous silicon layer is 103 formed by depositing amorphous silicon on the buffer layer 102 at a temperature 300° C. to 400° C. in PECVD (Plasma Enhanced Chemical Vapor Deposition), LPCVD (Low Pressure CVD) or a sputtering method with silane gas. Subsequently, a polycrystalline silicon layer is formed by laser irradiation of the amorphous silicon layer.

Before performing the process of forming the polycrystalline silicon layer, a dehydrogenation process is performed. That is, because the amorphous silicon layer formed in the plasma CVD method contains hydrogen at 10% approximately, the dehydrogenation process is performed at a temperature of 430° C. for two hours so as to remove the hydrogen from the amorphous silicon layer 103.

The amorphous silicon layer 103 is crystallized according to the following methods.

Using an ELA (excimer laser annealing) method, an eximer laser irradiates the entire surface of the amorphous silicon layer to form a polycrystalline silicon layer.

Using an SPC (solid phase crystallization) method, a heat treatment is performed on the amorphous silicon layer at a high temperature for a long time to form the polycrystalline silicon layer.

Using an MIC (metal induced crystallization) method, after selectively depositing metal on the amorphous silicon layer, a heat treatment is applied to form the polycrystalline silicon layer. Using this method, it is possible to use a large-sized glass substrate.

Also, ultraviolet rays are irradiated onto the amorphous silicon layer containing particles of a transit metal such as nickel, and an electric field is applied thereto. Thus, the amorphous silicon layer is crystallized to become a polycrystalline silicon layer so as to improve characteristics of a thin film. That is, in case of that ultraviolet rays and electric field are simultaneously applied to the amorphous silicon layer containing a metal such as nickel Ni, it is possible to obtain a shorter crystallization time period and lower crystallization temperature as compared with those of the MIC method. Then, the polycrystalline silicon layer is selectively removed by photolithography, thereby forming the active layer 103.

Figure 7B:
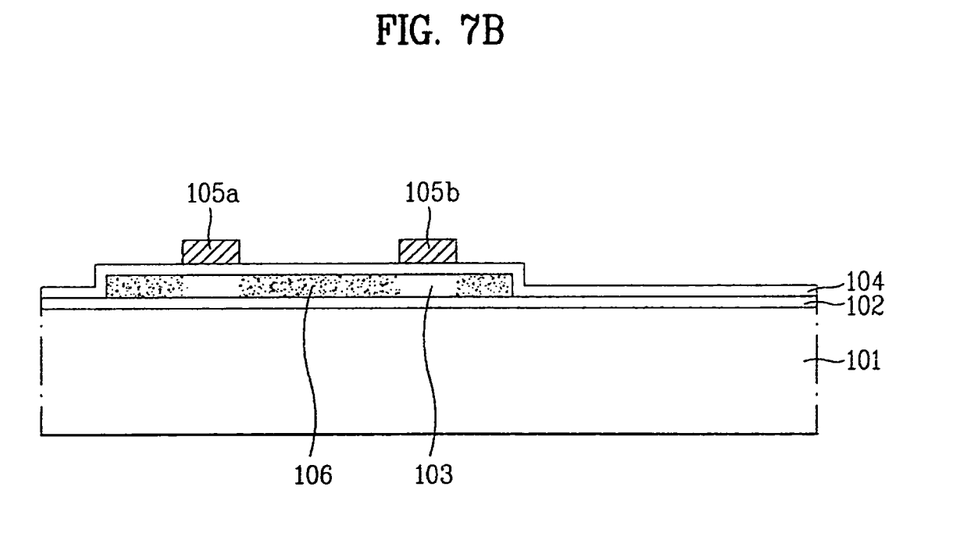

As shown in FIG. 7B, a gate insulating layer 104 is formed over the entire surface of the insulating substrate 101 including the active layer 103. Then, a low-resistance metal layer is deposited on the gate insulating layer 104.

Subsequently, the metal layer is selectively removed by photolithography so that the gate electrode 105a and the storage electrode 105b are formed at a predetermined interval. The gate insulating layer 104 is formed by depositing an inorganic insulating material such as silicon oxide or silicon nitride, or an organic insulating material such as BenzoCycloButene (BCB) or acrylic resin using a CVD method. Also, the metal layer is formed of conductive metal material such as aluminum Al, aluminum alloy AlNd, chrome Cr, tungsten W or molybdenum Mo by sputtering.

The material of the gate electrode 105a greatly affects operation of the LCD device. To decrease RC delay, the gate electrode 105a is generally formed of aluminum Al having a low resistance. However, in case the gate electrode is formed of pure aluminum Al, defects in the lines are caused by hillock generation during the heat treatment of high temperature because pure aluminum has bad corrosion resistance. In this respect, it is usual to apply the aluminum alloy or deposition structure.

After that, n-type or p-type impurity ions are selectively doped on the entire surface of the insulating substrate 101 by using the gate electrode 105a as a mask, whereby the source/drain impurity regions 106 are formed on the active layer 103 at both sides of the gate electrode 105a.

Figure 7C:
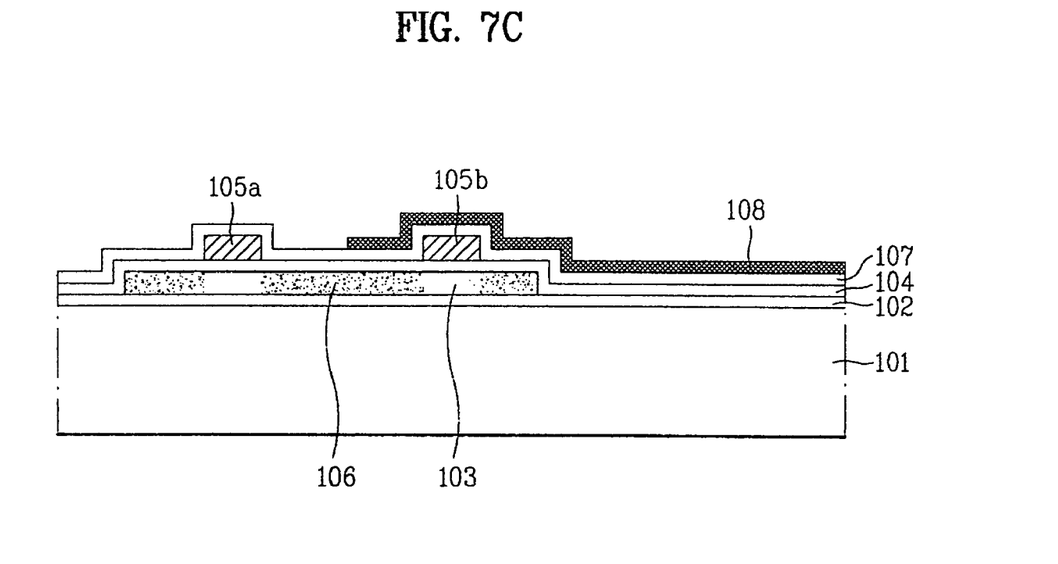

As shown in FIG. 7C, a first insulating interlayer 107 is formed over the entire surface of the insulating substrate 101 including the gate electrode 105a. After that, a transparent metal layer is deposited on the first insulating interlayer 107. At this time, the transparent metal layer is formed of any one of transparent conductive metals such as indium-tin-oxide (ITO) or indium-zinc-oxide (IZO). Then, the transparent metal layer is selectively removed by photolithography to form the transparent electrode 108 being overlapped with the storage electrode 105b. At this time, a storage capacitor is formed by the storage electrode 105b, the first insulating interlayer 107, and the transparent electrode 108.

Figure 7D:
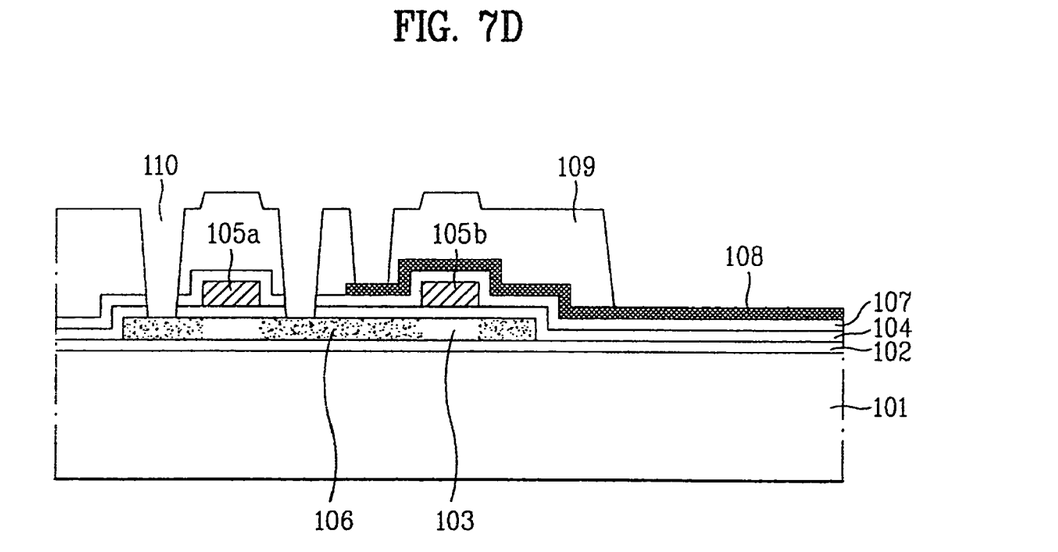

As shown in FIG. 7D, a second insulating interlayer 109 is formed over the entire surface of the insulating substrate 101 including the transparent electrode 108. Then, the second insulating interlayer 109, the first insulating interlayer 107 and the gate insulating layer 104 are selectively removed to expose the predetermined portions of the source/drain impurity regions 106 and the transparent electrode 108 by photolithography, thereby forming the first contact hole 110. Meanwhile, when forming the first contact hole 110 according to the present invention, a transmission region is defined by selectively removing the second insulating interlayer 109.

Figure 7E:
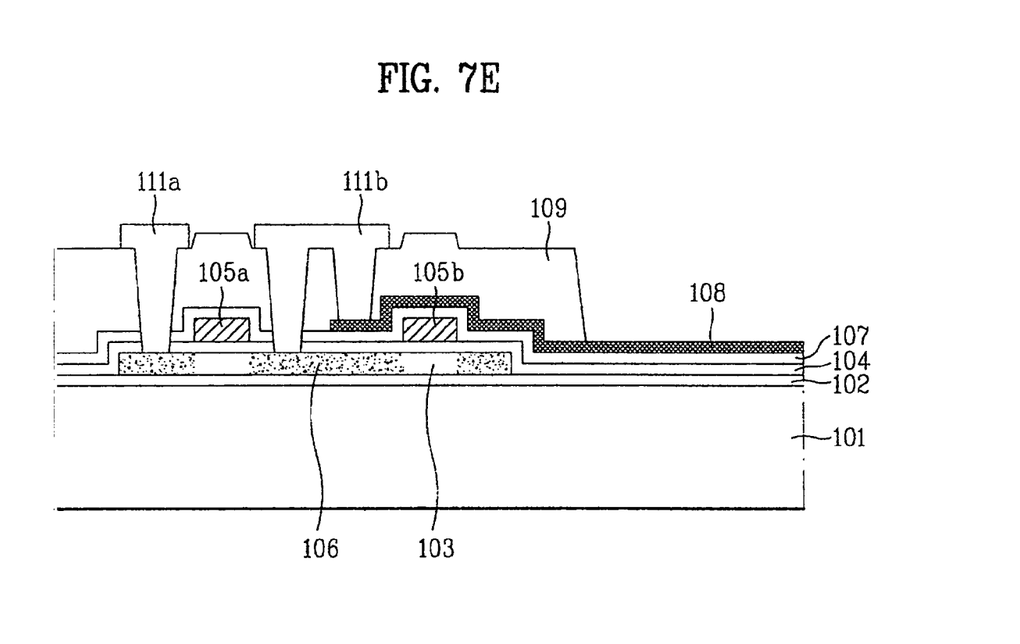

As shown in FIG. 7E, a metal layer is deposited over the entire surface of the insulating substrate 101 including the first contact hole 110. Then, the metal layer is selectively removed by photolithography, thereby forming the source electrode 111a and the drain electrode 111b connected with the source/drain impurity regions 106 and the transparent electrode 108 through the first contact hole 110. At this time, the drain electrode 111b is connected with the source/drain impurity regions 106 and the transparent electrode 108.

Figure 7F:
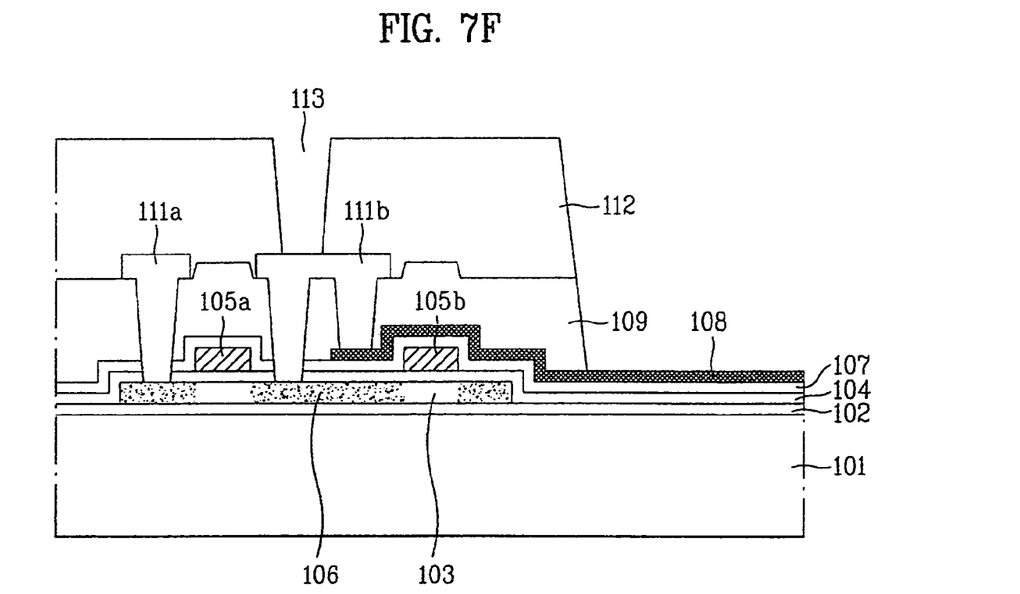

As shown in FIG. 7F, a passivation layer 112 is formed over the entire surface of the insulating substrate 101 including the source electrode 111a and the drain electrode 111b. The passivation layer 112 is formed of an organic insulating layer such as acrylic resin, polyimide, BCB (BenzoCycloButene), oxide layer or nitride layer at a thickness of 1 $\mu$m to 5 $\mu$m. After that, the passivation layer 112 is selectively removed to expose the predetermined portion of the drain electrode 111b by photolithography, thereby forming the second contact hole 113. When forming the second contact hole 113, the passivation layer 112 is selectively removed to expose the transparent electrode 108 corresponding to the transmission region. Meanwhile, a silicon nitride layer SiNx is deposited on the passivation layer 112. At this time, it is possible to selectively remove the portion corresponding to the transmission region of the passivation layer 112.

Figure 7G:
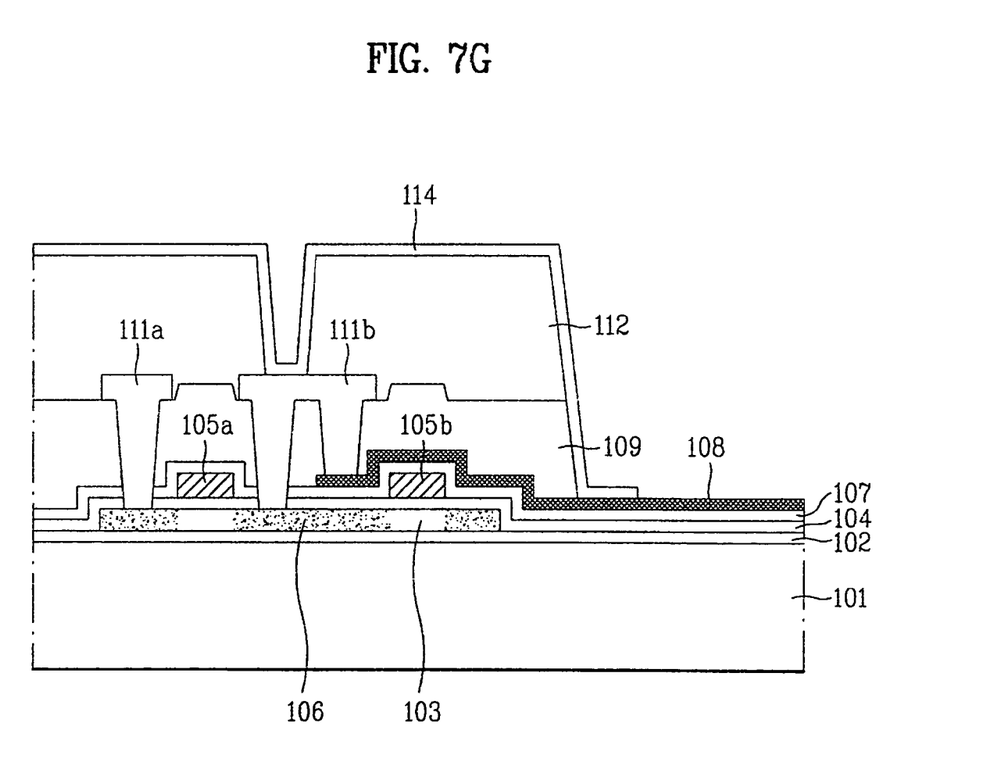

As shown in FIG. 7G, an opaque metal layer is deposited over the entire surface of the insulating substrate 101. Then, the opaque metal layer is selectively removed by photolithography, so that the reflective electrode 114 overlapped with the predetermined portions of the active layer 103 and the transparent electrode 108 is formed. For example, the opaque metal layer is formed of any one of Al layer, Ag layer, MoW layer, Al—Nd alloy layer or Cr layer.

When forming the reflective electrode 114 having a dual layered structure of first and second reflective electrodes, the first electrode is formed of the conductive metal materials having great corrosion resistance, such as chrome Cr, molybdenum Mo, tungsten W and titanium Ti.

If the first reflective electrode is formed of chrome Cr, an etchant is used of a mixture of Ceric Ammonium Nitrate and nitride acid $NHO_3$. Also, in case of the reflective electrode having the dual layered structure of the first and second reflective electrodes, the second reflective electrode is formed of the conductive metal material such as aluminum Al or aluminum alloy having great reflectivity and low resistance. An etchant for patterning the second reflective electrode is formed of a mixture of phosphoric acid $H_3PO_4$, acetic acid $CH_3COOH$ and nitride acid $NHO_3$.

If the first reflective electrode is formed of molybdenum Mo, it is possible to etch the first reflective electrode and the second reflective electrode of aluminum by using as the etchant, the mixture of phosphoric acid $H_3PO_4$, acetic acid $CH_3COOH$ and nitride acid $NHO_3$. Also, the second reflective electrode of aluminum is wet-etched with the etchant, and the first reflective electrode is dry-etched. In this case, the first reflective electrode may be formed of chrome Cr, molybdenum Mo, tungsten W or titanium Ti.

As mentioned above, the transflective type LCD device according to the present invention and method for manufacturing the same has the following advantages.

First, it is possible to remove masks for storage doping and opening a through hole, thereby strengthening competitiveness of cost and improving yield.

Also, it is possible to obtain the storage capacitance by forming the transparent electrode on the insulating interlayer.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A transflective type liquid crystal display (LCD) device comprising:
    a substrate having reflection and transmission regions;
    an active layer on the reflection region of the substrate;
    a gate insulating layer over an entire surface of the substrate including an active layer;
    gate and storage electrodes on the gate insulating layer corresponding to the active layer and having a predetermined interval therebetween;
    source/drain impurity regions in the active layer at both sides of the gate electrode;
    a first insulating layer over the entire surface of the substrate including the gate electrode;

a transparent electrode over the transmission region of the first insulating layer, and overlapped with the storage electrode;

a second insulating layer over the reflection region of the substrate, and having a first contact hole for exposing predetermined portions of the source/drain impurity regions and the transparent electrode;

source and drain electrodes connected with the source/drain impurity regions and the transparent electrode through the first contact hole;

a third insulating layer over the reflection region of the substrate, and having a second contact hole for exposing a predetermined portion of the drain electrode; and a reflective electrode connected with the drain electrode and the transparent electrode through the second contact hole, and formed over the reflection region of the substrate.

2. The transflective type LCD device of claim 1, further comprising a buffer layer formed between the active layer and the substrate.

3. The transflective type LCD device of claim 2, wherein the buffer layer comprises silicon nitride.

4. The transflective type LCD device of claim 2, wherein the buffer layer comprises silicon oxide.

5. The transflective type LCD device of claim 1, wherein the gate and storage electrodes comprise the same material.

6. The transflective type LCD device of claim 1, wherein the reflective electrode comprise any one of metal materials such as aluminum Al and aluminum alloy.

7. The transflective type LCD device of claim 1, wherein the transparent electrode comprises transparent metal materials such as indium-tin-oxide (ITO) and indium-zinc-oxide (IZO).

8. The transflective type LCD device of claim 1, wherein the active layer comprises a polycrystalline silicon layer.

9. A method for manufacturing a transflective type liquid crystal display (LCD) device comprising the steps of:

preparing an insulating substrate having reflection and transmission regions;

forming an active layer on a reflection region of the insulating substrate;

forming a gate insulating layer on an entire surface of the insulating substrate including the active layer;

forming gate and storage electrodes over the gate insulating layer corresponding to the active layer and having a predetermined interval therebetween;

forming source/drain impurity regions in the active layer at both sides of the gate electrode;

forming a first insulating layer over the entire surface of the insulating substrate including the gate electrode;

forming a transparent electrode over the transmission region of the first insulating layer, and overlapped with the storage electrode;

forming a second insulating layer over the reflection region of the insulating substrate, and having a first contact hole for exposing predetermined portions of the source/drain impurity regions and the transparent electrode;

forming source and drain electrodes connected with the source/drain impurity regions and the transparent electrode through the first contact hole;

forming a third insulating layer over the reflection region of the insulating substrate, and having a second contact hole for exposing predetermined portions of the transparent electrode and the drain electrode; and forming a reflective electrode connected with the transparent electrode and the drain electrode through the second contact hole.

10. The method of claim 9, wherein the step of forming the active layer includes the steps of:

forming a buffer layer over the insulating substrate;

forming an amorphous silicon layer over the buffer layer;

removing hydrogen from the amorphous silicon layer;

forming a polycrystalline silicon layer by crystallizing the amorphous silicon layer; and selectively removing the polycrystalline silicon layer to form an active layer.

11. The method of claim 10, wherein the polycrystalline silicon layer is formed by depositing the amorphous silicon layer on the insulating substrate, and applying laser radiation thereto.

12. The method of claim 10, wherein the polycrystalline silicon layer is formed using a SPC (solid phase crystallization) method of depositing the amorphous silicon layer on the insulating substrate, and by heat treating the amorphous silicon layer.

13. The method of claim 10, wherein the polycrystalline silicon layer is formed by depositing the amorphous silicon layer on the insulating substrate, depositing metal on the amorphous silicon layer, and heat treating the amorphous silicon layer.

14. The method of claim 10, wherein the polycrystalline silicon layer is formed by depositing an amorphous silicon layer on the insulating substrate, and applying ultraviolet rays and an electric field thereto.

15. The method of claim 9, wherein the reflective electrode is formed of any one of an Al layer, an Ag layer, a MoW layer, an Al—Nd alloy layer and a Cr layer.

16. The method of claim 9, wherein the reflective electrode is formed by depositing first and second reflective electrodes.

17. The method of claim 16, wherein the first reflective electrode comprises any one of chrome Cr, molybdenum Mo, tungsten W and titanium Ti.

18. The method of claim 16, wherein the second reflective electrode comprises any one of aluminum and aluminum alloy.

19. The method of claim 16, wherein the first reflective electrode is dry-etched.

20. The method of claim 16, wherein the second reflective electrode is wet-etched.

* * * * *